(12) United States Patent
Mizutani

(10) Patent No.: US 7,653,764 B2
(45) Date of Patent: Jan. 26, 2010

(54) FAULT-TOLERANT COMPUTER AND METHOD OF CONTROLLING DATA TRANSMISSION

(75) Inventor: Fumitoshi Mizutani, Tokyo (JP)

(73) Assignee: NEC Corporation, Tokyo (JP)

( * ) Notice: Subject to any disclaimer, the term of this patent is extended or adjusted under 35 U.S.C. 154(b) by 330 days.

(21) Appl. No.: 11/302,176

(22) Filed: Dec. 14, 2005

(65) Prior Publication Data
US 2006/0150000 A1 Jul. 6, 2006

(30) Foreign Application Priority Data
Dec. 21, 2004 (JP) .............................. 2004-369389

(51) Int. Cl.
*G06F 13/28* (2006.01)
*G06F 5/00* (2006.01)
*G06F 11/00* (2006.01)

(52) U.S. Cl. ................................ 710/29; 710/52; 714/6; 714/11; 714/12

(58) Field of Classification Search .................... 710/29, 710/52; 714/6, 11, 12
See application file for complete search history.

(56) References Cited

U.S. PATENT DOCUMENTS

| 5,255,367 A | * | 10/1993 | Bruckert et al. | ............... 714/11 |
| 5,325,517 A | * | 6/1994 | Baker et al. | ................... 714/11 |
| 5,953,742 A | | 9/1999 | Williams | ..................... 711/154 |
| 6,212,582 B1 | | 4/2001 | Chong et al. | |
| 6,557,053 B1 | | 4/2003 | Bass et al. | |
| 2001/0025352 A1 | | 9/2001 | Ghameshlu et al. | |

FOREIGN PATENT DOCUMENTS

| JP | 10-177498 | 6/1998 |
| JP | 2001-216257 A | 8/2001 |
| JP | 2001-222505 A | 8/2001 |
| JP | 2003-140882 A | 5/2003 |

* cited by examiner

*Primary Examiner*—Henry W. H. Tsai
*Assistant Examiner*—Tushar S Shah
(74) *Attorney, Agent, or Firm*—Foley & Lardner LLP

(57) ABSTRACT

A fault-tolerant computer is capable of performing a data flow control process in a short period of time. The fault-tolerant computer includes a pair of duplicate systems each having a CPU subsystem and an IO subsystem. The IO subsystems of the duplicate systems are connected to each other through a cross link. The CPU system has an inbound reception buffer which receives data sent from the IO subsystem, and when the amount of the received data reaches a first threshold value, sends a first signal to the IO subsystem, and when the amount of the received data reaches a second threshold value greater than the first threshold value, sends a second signal to the IO subsystem. The IO subsystem has an IO I/F controller to stop sending data to the CPU subsystem when the IO I/F controller receives the first signal and the second signal, and a flow controller to send the second signal to the IO I/F controller of the paired IO subsystem through the cross link after the flow controller receives the second signal.

2 Claims, 8 Drawing Sheets

FAULT-TOLERANT COMPUTER AND METHOD OF CONTROLLING DATA TRANSMISSION

BACKGROUND OF THE INVENTION

1. Field of the Invention

The present invention relates to a fault-tolerant computer with duplex systems each comprising a CPU subsystem having a CPU and a main storage unit, and an IO subsystem, and a method of controlling data transmission.

2. Description of the Related Art

In recent years, growing computer functionality has enabled computers to be used in a wider variety of fields. Such computers are required to operate continuously even in the event of faults. One solution to meet this requirement is fault-tolerant technology with dual systems as disclosed in Japanese laid-open patent publication No. 10-177498, for example.

Some fault-tolerant computers built on fault-tolerant technology have duplicate systems each of which includes a CPU subsystem having a CPU and a main storage unit, and an IO subsystem. The fault-tolerant computers with duplicate systems employ a lock-step system for operating the two CPU subsystems identically to each other based on a common internal clock. The fault-tolerant computers have a high-speed interface for communication between the two IO subsystems, the interface employing a serial link that operates out of synchronism with the internal clock.

FIG. 1 of the accompanying drawings shows in block form a conventional fault-tolerant computer of the above configuration.

As shown in FIG. 1, the conventional fault-tolerant computer has two systems #0, #1. Systems #0, #1 are structurally identical to each other and are paired with each other as duplicate systems. Systems #0, #1 are connected to each other by a serial IO I/F cross link.

Systems #0, #1 comprise respective CPU subsystems that are operable synchronously with each other based on a common internal clock according to a lock-step system and respective IO subsystems that are operable based on respective clocks.

The IO subsystems have respective IO I/F controllers 211-0, 211-1 for controlling data as it is input to and output from external circuits, respective buffers 208-0, 208-1 for temporarily storing data that are transferred from IO I/F controllers 211-0, 211-1 to the CPU subsystems, respective buffers 209-0, 209-1 for temporarily storing data that are transmitted from the CPU subsystems to IO I/F controllers 211-0, 211-1, respective IO access comparators 210-0, 211-1 for comparing access from the CPU subsystems to IO I/F controllers 211-0, 211-1 and for comparing access from the other systems to IO I/F controllers 211-0, 211-1 via the serial IO I/F cross link with each other, respective flow controllers 212-0, 212-1 for monitoring the amounts of data stored in buffers 208-0, 208-1 and for notifying IO I/F controllers 211-0, 211-1 that the monitored amounts of data are equal to or greater than a certain threshold value, and respective flow controllers 207-0, 207-1, responsive to Almost-Full signals S23-0, S23-1 sent from the CPU subsystems when the amounts of data stored in buffers 209-0, 209-1 are equal to or greater than a certain threshold value, for notifying IO I/F controllers 211-0, 211-1 that the amounts of data stored in buffers 209-0, 209-1 are equal to or greater than the certain threshold value.

The CPU subsystems have respective CPUs 201-0, 201-1, respective main storage units 202-0, 202-1, respective memory bus controllers 203-0, 203-1 for controlling data as it is written into and read from main storage units 202-0, 202-1, respective CPU bus controllers 204-0, 204-1 for controlling access to CPUs 201-0, 201-1, respective routers 205-0, 205-1 including respective inbound reception buffers 206-0, 206-1, for switching access control between CPU bus controllers 204-0, 204-1 and buffers 208-0, 208-1, 209-0, 209-1.

CPUs 201-0, 201-1 of systems #0, #1 operate identically to each other according to the lock-step synchronizing system. The ranges of the CPU subsystems that operate identically to each other range from CPUs 201-0, 201-1 to routers 205-0, 205-1 above the boundary represented by the broken line in FIG. 1.

To keep systems #0, #1 in synchronous operation, it is necessary that responses from the IO subsystems arrive simultaneously at the boundary between the IO subsystems and the CPU subsystems. Specifically, there is the state condition in which the arrival of access from IO I/F controllers 211-0, 211-1 to the CPU subsystems and the reception of access from the CPU subsystems to IO I/F controllers 211-0, 211-1 have to be performed simultaneously.

Access from the CPU subsystems to the IO subsystems will be referred to as outbound access, and access from the IO subsystems to the CPU subsystems as inbound access.

Operation of the conventional fault-tolerant computer for outbound access from the CPU subsystems to IO I/F controllers 211-0, 211-1 will first be described below with reference to FIG. 2 of the accompanying drawings.

Because the CPU subsystems of systems #0, #1 operate in lock-step synchronism, routers 205-0, 205-1 start outputting access packets simultaneously in systems #0, #1. If the target IO I/O controller is IO I/F controller 211-0 of system #0, the access packet from the CPU system of system #0 is transferred through an internal data bus to buffer 209-0 and then reaches IO access comparator 210-0 after being delayed a certain time by buffer 209-0. The access packet from the CPU system of system #1 is transferred through the serial IO I/F cross link, as an external data bus, and then reaches IO access comparator 210-0 of system #0. Usually, the access packet that is transferred through the external data bus suffers an arrival time delay because of synchronization due to a clock pulse difference between the IO I/F and the internal logic and an interconnect flight time loss. However, since such an arrival time delay can be compensated for by the buffer associated with the internal bus, the access packets from systems #0, #1 can arrive simultaneously at IO access comparator 210-0. Furthermore, since the internal buses leading to IO access comparators 210-0, 210-1 have respective buffers 209-0, 209-1, buffers 209-0, 209-1 continue to accept access packets from the CPU subsystem insofar as empty storage areas are available in buffers 209-0, 209-1.

When the amount of data stored in buffer 209-0 that precedes IO access comparator 210-0 reaches a certain threshold value, then a flow control signal is generated to stop outbound access. The flow control signal will be described below with reference to FIG. 3 of the accompanying drawings.

General high-speed IO interfaces send a reception buffer credit at appropriate times so that the receiving buffer can recognize the capacity of packets that can be received, thereby preventing an overflow from the receiving buffer. Usually, the reception buffer credit is set as an interrupt between data packets that the user is to send.

The flow control signal is generated as an interrupt between inbound access packets from IO I/F controller 211-0. Almost-Full signal S22-0 is sent from IO I/F controller 211-0 through the internal bus to router 205-0 of system #0, and also sent from IO I/F controller 211-0 through the serial IO I/F cross link, as the external bus, to router 205-1 of system #1. Almost- Full signal S22-0 that is to be sent to router 205-0, is adjusted for timing, taking into consideration the travel time over the serial IO I/F cross link so that Almost-Full signal S22-0 can arrive simultaneously at systems #0, #1.

Operation of the conventional fault-tolerant computer for inbound access from IO I/F controllers 211-0, 211-1 to the CPU subsystems of systems #0, #1 will be described below with reference to FIG. 4 of the accompanying drawings.

IO I/F controller 211-0 simultaneously outputs access packets to the CPU subsystem of system #0 and to the CPU subsystem of system #1. The access packet for the CPU subsystem of system #0 is transferred through buffer 208-0 for timing adjustment and then reaches router 205-0. The access packet for the CPU subsystem of system #1 is transferred through the serial IO I/F cross link as the external bus and then reaches router 205-1.

If the amounts of data stored in respective inbound reception buffers 206-0, 206-1 of routers 205-0, 205-1 reach a predetermined threshold value, then, as shown FIG. 5 of the accompanying drawings, flow control signals are generated to stop inbound access. Specifically, Almost-Full signals S21-0, S21-1, S23-0, S23-1 are sent from inbound reception buffers 206-0, 206-1 to IO I/F controllers 211-0, 211-1 and also to flow controllers 207-0, 207-1 for the serial IO I/F cross link. The flow control event occurs simultaneously in systems #0, #1 because CPUs 201-0, 201-1 operate in lock-step synchronism.

The flow control signal sent from system #1 to system #0 is transferred through the serial IO I/F cross link, and is sent as an interrupt between ordinary outbound data packets. Therefore, system #0 needs to wait for outbound access.

To keep the CPU subsystems of both the systems in lock-step synchronism, it is necessary to emulate transaction control over the serial IO I/F cross link, including waiting for the transmission of ordinary data packets for sending flow control signals.

As described above, in order to keep the CPU subsystems of both the systems in lock-step synchronism in the fault-tolerant computer with the CPU subsystems employing the lock-step system, it is necessary to emulate transaction control over the serial IO I/F cross link, including waiting for the transmission of ordinary data packets for sending flow control signals. However, a circuit for emulating transaction control over the serial IO I/F cross link needs to perform a complex control process and is of a large scale, and the emulating process is time-consuming.

SUMMARY OF THE INVENTION

It is therefore an object of the present invention to provide a fault-tolerant computer which is capable of performing a data flow control process in a short period of time.

According to the present invention, there is provided a fault-tolerant computer comprising a pair of duplicate systems, each of the duplicate systems comprising a CPU subsystem for controlling access to a CPU and a storage unit, and an IO subsystem for controlling data which are input to the IO subsystem from an external circuit and which are output from the IO subsystem to the external circuit, wherein the CPU systems of the duplicate systems operate identically to each other based on a common internal clock according to a lock-step system, and the IO subsystems of the duplicate systems are connected to each other through a cross link, wherein the CPU subsystem receives data sent from the IO subsystem, and when the amount of the received data reaches a first threshold value, the CPU subsystem sends a first signal to the IO subsystem, and when the amount of the received data reaches a second threshold value greater than the first threshold value, the CPU subsystem sends a second signal to the IO subsystem, the IO subsystem comprising an IO I/F controller for to stop sending data to the CPU subsystem when the IO I/F controller receives the first signal and the second signal, and a flow controller to send the second signal to the IO I/F controller of the paired IO subsystem through the cross link after the flow controller receives the second signal.

According to the present invention, there is also provided a method of controlling data transmission in a fault-tolerant computer having a pair of duplicate systems, each of the duplicate systems comprising a CPU subsystem for controlling access to a CPU and a storage unit, and an IO subsystem for controlling data which are input to the IO subsystem from an external circuit and which are output from the IO subsystem to the external circuit, wherein the CPU systems of the duplicate systems operate identically to each other based on a common internal clock according to a lock-step system, and the IO subsystems of the duplicate systems are connected to each other through a cross link, the method comprising the steps of controlling the CPU subsystem to receive data sent from the IO subsystem, and when the amount of the received data reaches a first threshold value, controlling the CPU subsystem to send a first signal to the IO subsystem, and when the amount of the received data reaches a second threshold value greater than the first threshold value, controlling the CPU subsystem to send a second signal to the IO subsystem, and controlling the IO subsystem to stop sending data to the CPU subsystem after the IO subsystem receives the first signal and the second signal, and controlling the IO subsystem to send the second signal to the paired IO subsystem through the cross link after the IO subsystem receives the second signal.

With the above arrangement, when the first signal is sent, the IO subsystem stops sending data to the CPU subsystem. Since the first signal is not output to the cross link, a timing adjustment which has heretofore been necessary is not required.

According to the present invention, data flow control can be performed in a short period of time.

The above and other objects, features, and advantages of the present invention will become apparent from the following description with reference to the accompanying drawings which illustrate an example of the present invention.

DETAILED DESCRIPTION OF THE PREFERRED EMBODIMENT

Figure 6:
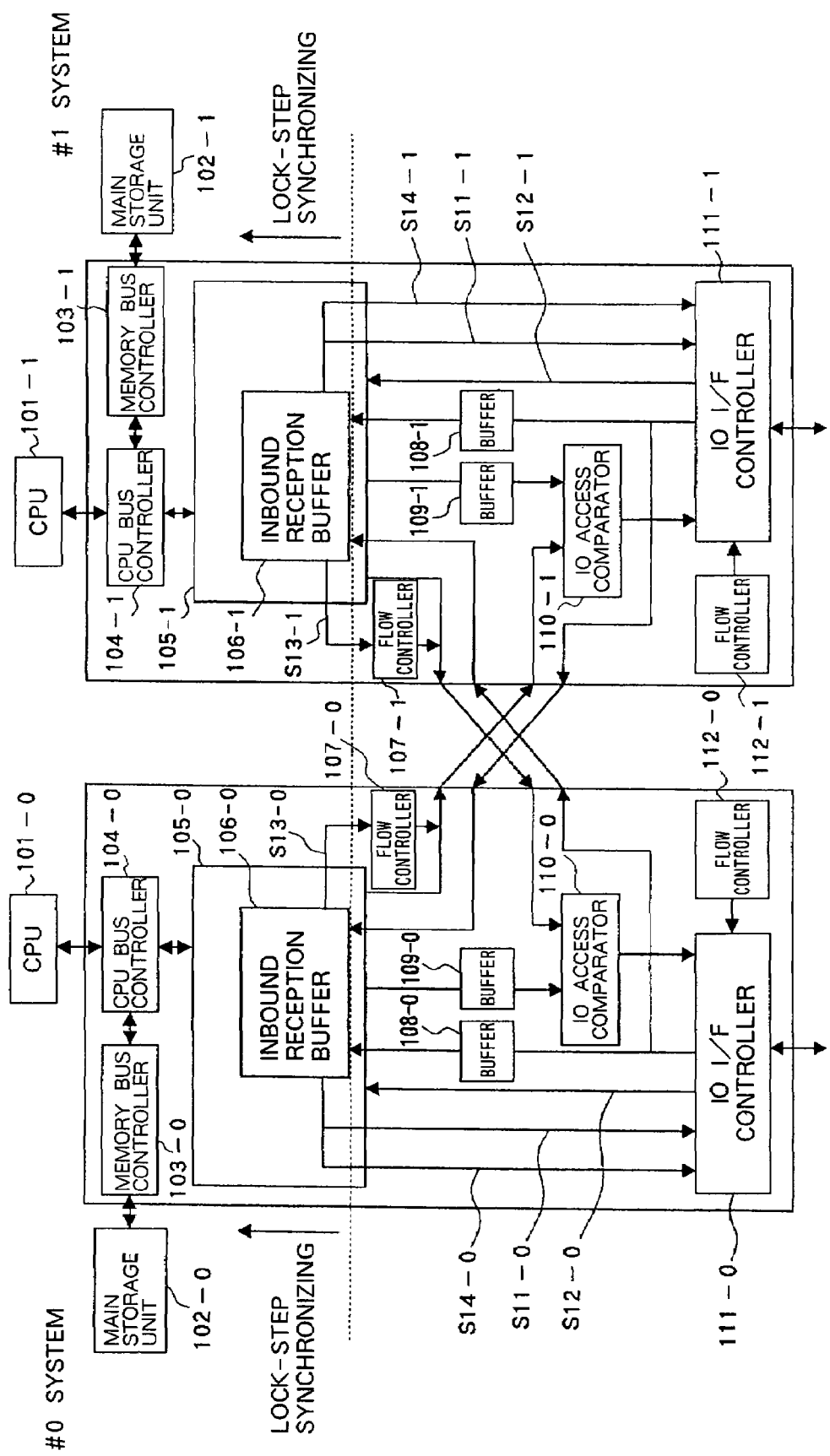
FIG. 6 is a block diagram of a fault-tolerant computer according to an embodiment of the present invention.

FIG. 6 shows in block form a fault-tolerant computer according to an embodiment of the present invention.

As shown in FIG. 6, the fault-tolerant computer according to the embodiment of the present invention has two systems #0, #1. Systems #0, #1 are structurally identical to each other and are paired with each other as duplicate systems. Systems #0, #1 are connected to each other by a serial IO I/F cross link.

Systems #0, #1 comprise respective CPU subsystems that are operable synchronously with each other based on a common internal clock according to a lock-step system, and respective IO subsystems that are operable based on respective clocks.

The IO subsystems have respective IO I/F controllers 111-0, 111-1 for controlling data as it is input to and output from external circuits, respective buffers 108-0, 108-1 for temporarily storing data that is transferred from IO I/F controllers 111-0, 111-1 to the CPU subsystems, respective buffers 109-0, 109-1 for temporarily storing data that is transmitted from the CPU subsystems to IO I/F controllers 111-0, 111-1, respective IO access comparators 110-0, 111-1 for comparing access from the CPU subsystems to IO I/F controllers 111-0, 111-1 and for comparing access from the other systems to IO I/F controllers 111-0, 111-1, via the serial IO I/F cross link, with each other, respective flow controllers 112-0, 112-1 for monitoring the amounts of data stored in buffers 108-0, 108-1 and for notifying IO I/F controllers 111-0, 111-1 that the monitored amounts of data are equal to or greater than a certain threshold value, and respective flow controllers 107-0, 107-1 responsive to Almost-Full signals S13-0, S13-1 sent from the CPU subsystems when the amounts of data stored in buffers 109-0, 109-1 are equal to or greater than a certain threshold value, for notifying IO I/F controllers 111-0, 111-1 that the amounts of data stored in buffers 109-0, 109-1 are equal to or greater than a certain threshold value.

The CPU subsystems have respective CPUs 101-0, 101-1, respective main storage units 102-0, 102-1, respective memory bus controllers 103-0, 103-1 for controlling data as it is written into and read from main storage units 102-0, 102-1, respective CPU bus controllers 104-0, 104-1 for controlling access to CPUs 101-0, 101-1, respective routers 105-0, 105-1 including respective inbound reception buffers 106-0, 106-1, for switching access control between CPU bus controllers 104-0, 104-1 and buffers 108-0, 108-1, 109-0, 109-1.

Figure 1:
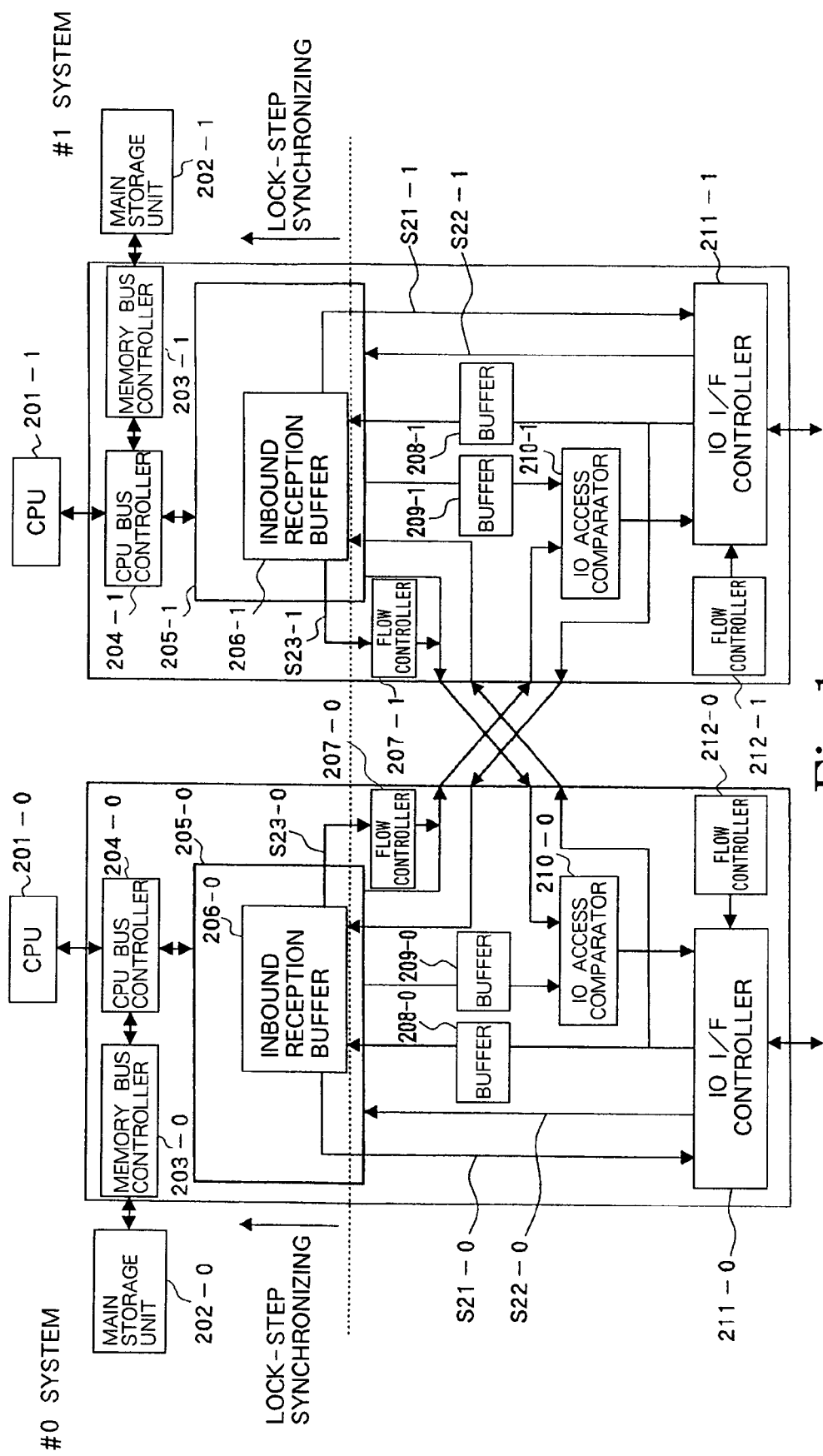
FIG. 1 is a block diagram of a conventional fault-tolerant computer.
Figure 2:
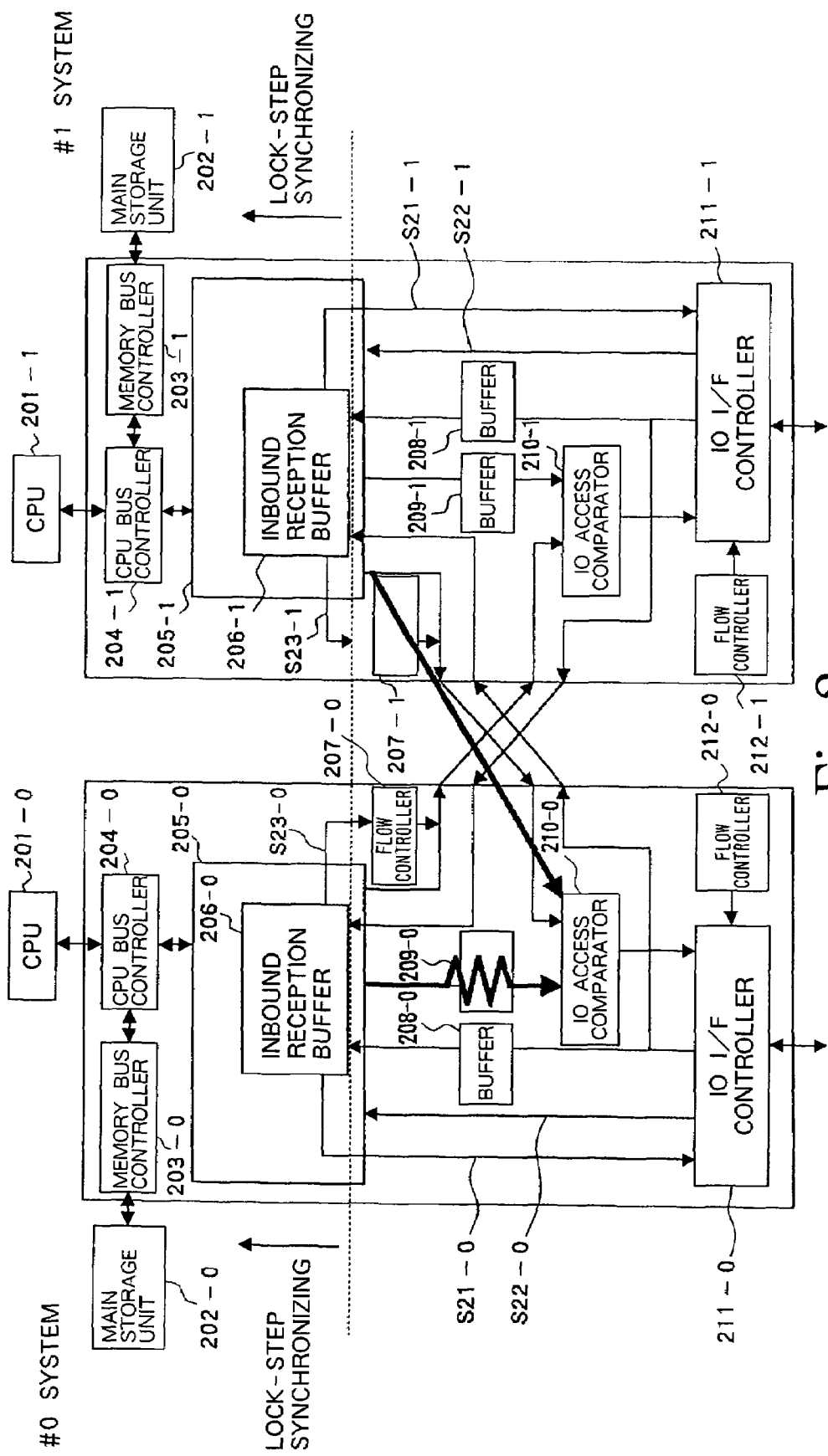
FIG. 2 is a block diagram showing a mode of operation of the conventional fault-tolerant computer shown in FIG. 1.
Figure 3:
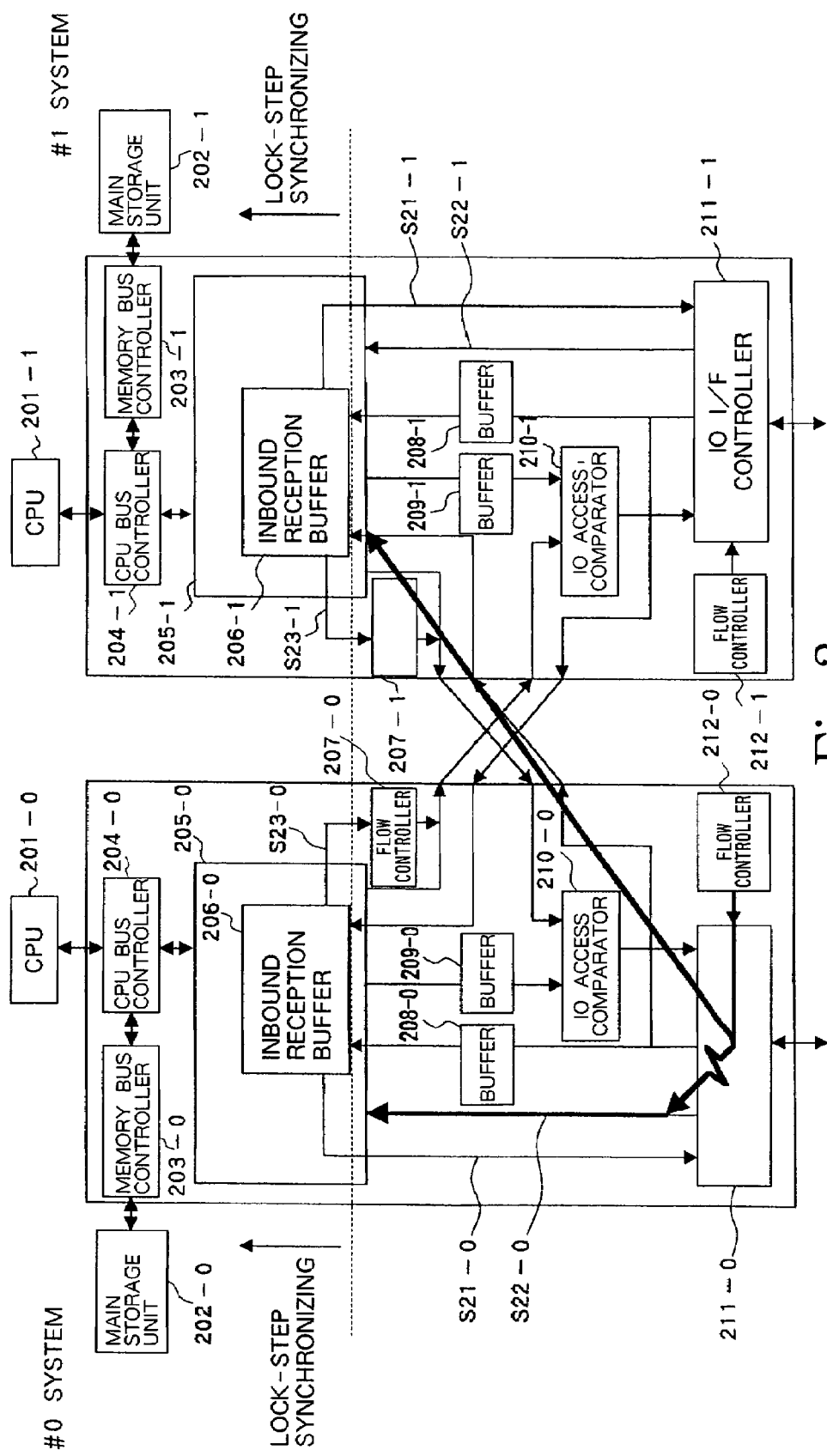
FIG. 3 is a block diagram showing another mode of operation of the conventional fault-tolerant computer shown in FIG. 1.
Figure 4:
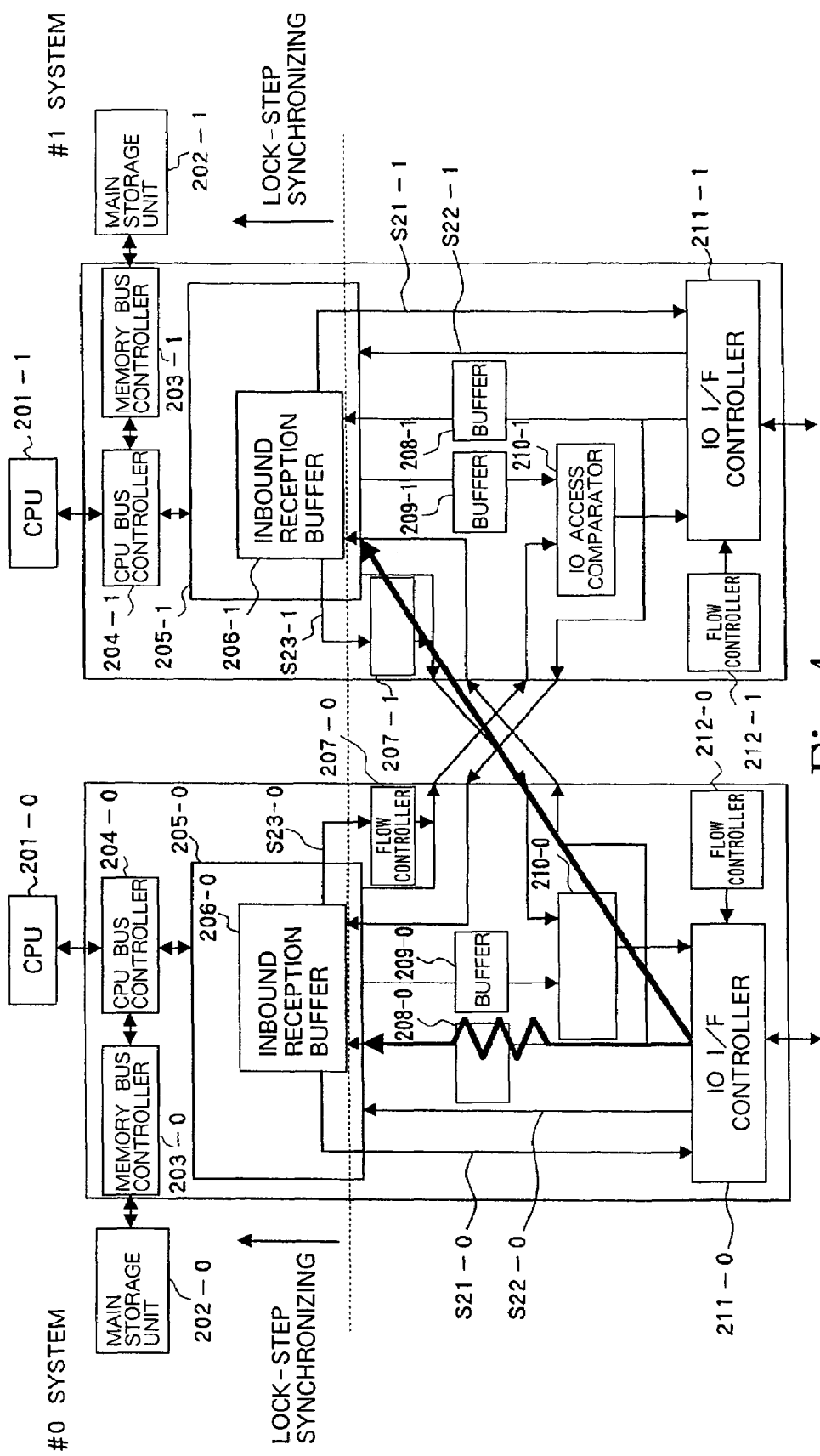
FIG. 4 is a block diagram showing still another mode of operation of the conventional fault-tolerant computer shown in FIG. 1.
Figure 5:
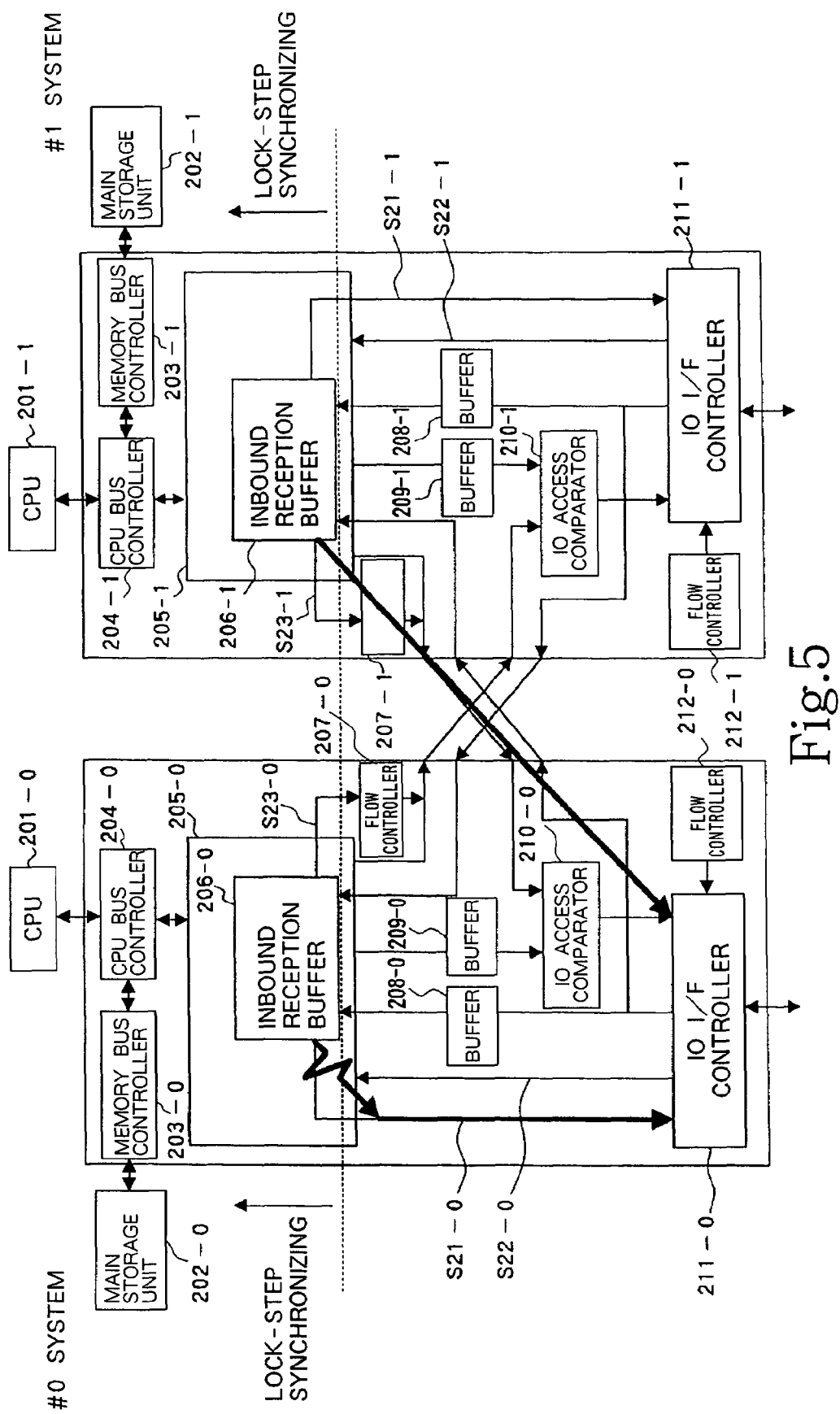
FIG. 5 is a block diagram showing yet another mode of operation of the conventional fault-tolerant computer shown in FIG. 1.

The above details of the fault-tolerant computer according to the embodiment of the present invention are identical to those of the conventional fault-tolerant computer. The fault-tolerant computer according to the embodiment of the present invention differs from the conventional fault-tolerant computer shown in FIG. 1 in that flow control signals for inbound reception buffers 106-0, 106-1 of routers 105-0, 105-1 include, in addition to conventional Almost-Full signals S11-0, S11-1, S12-0, S12-1, S13-0, S13-1, Half-Full signals S14-0, S14-1 that are asserted at a water line lower than the Almost-Full signals.

Figure 7:
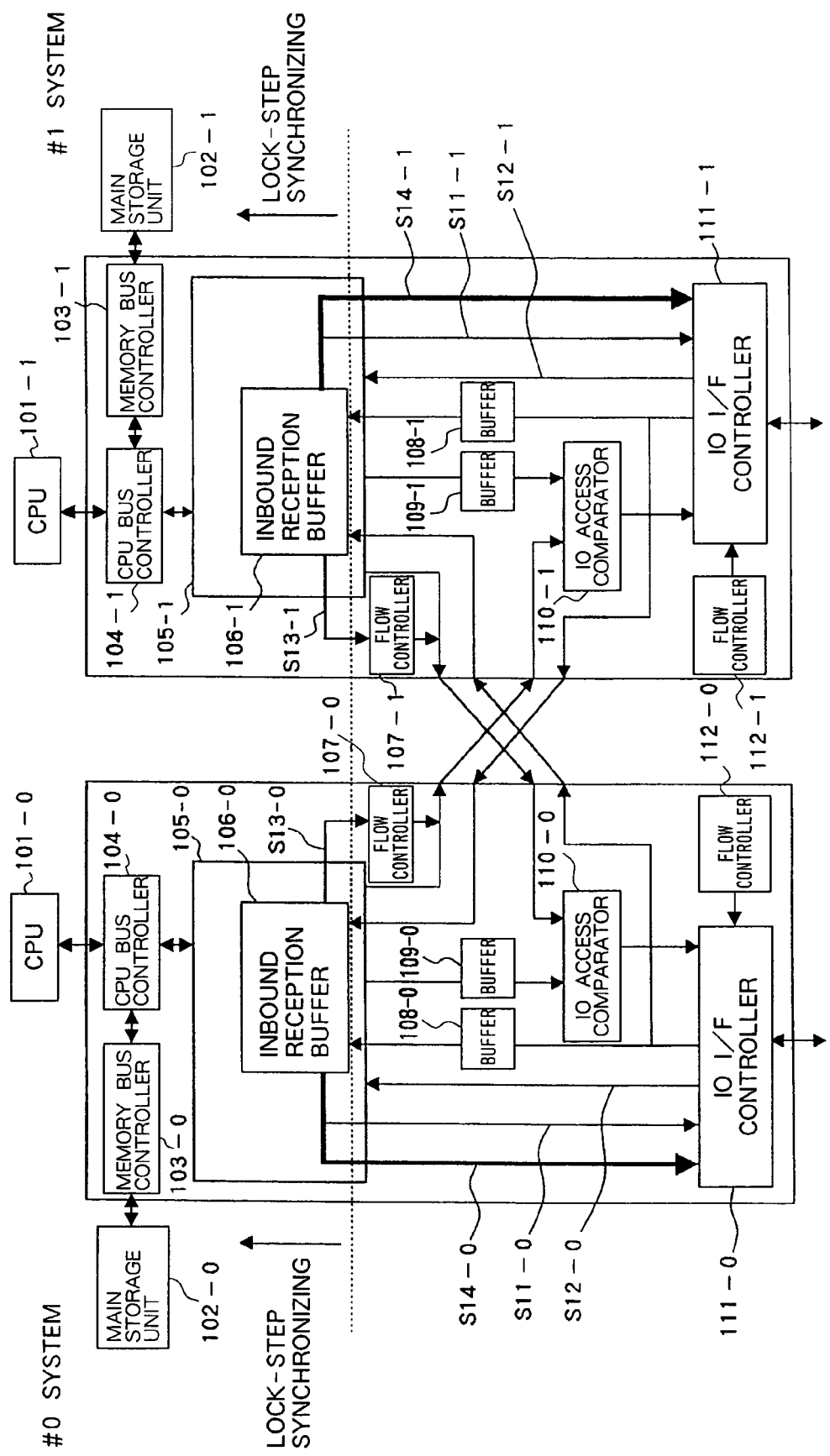
FIG. 7 is a block diagram showing a mode of operation of the fault-tolerant computer shown in FIG. 6.

As shown in FIG. 7, added Half-Full signals S14-0, S14-1 are applied to IO I/F controllers 111-0, 111-1 of their own systems (local systems), and not to flow controllers 107-0, 107-1 for the serial IO I/F cross link. Therefore, even when Half-Full signals S14-0, S14-1 are asserted, no flow control packets are sent over the serial IO I/F cross link. When Half-Full signals S14-0, S14-1 are asserted, however, IO I/F controllers 111-0, 111-1 stop sending inbound access packets. If IO I/F controllers 111-0, 111-1 keep sending inbound access packets even when Half-Full signals S14-0, S14-1 are asserted, then Almost-Full signals S11-0, S11-1, S12-0, S12-1, S13-0, S13-1 are asserted. Since the Almost-Full signals are sent to IO I/F controllers 111-0, 111-1 and flow controllers 107-0, 107-1 for the serial IO I/F cross link, flow control packets are sent over the serial IO I/F cross link when the Almost-Full signals are asserted.

While CPUs 101-0, 101-1 are operating in clock-step synchronism, the CPU subsystems of systems #0, #1 operate identically to each other. Therefore, Half-Full signal S14-0 in system #0 and Half-Full signal S14-1 in system #1 each have the same timing.

Figure 8:
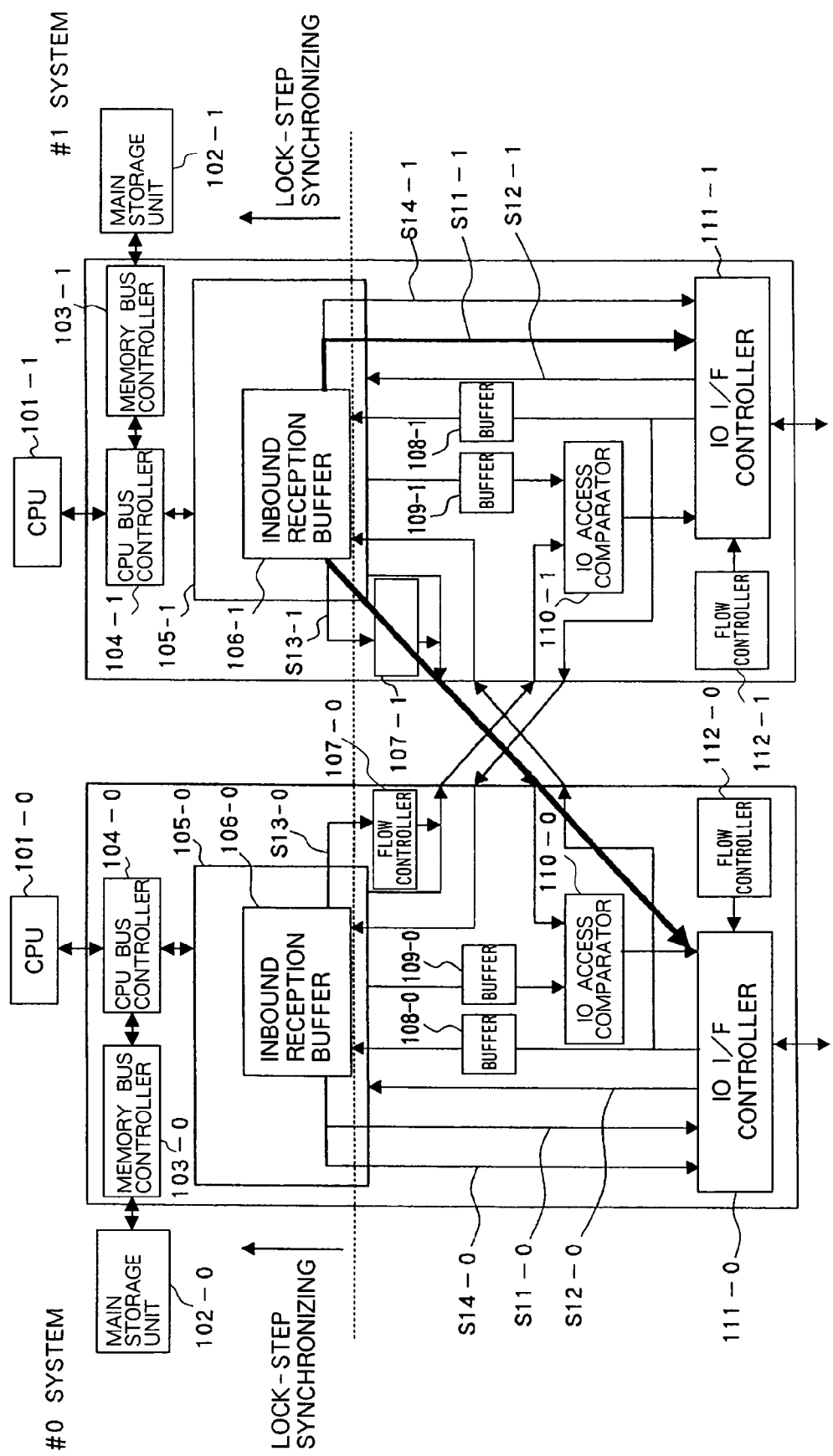
FIG. 8 is a block diagram showing a mode of operation of the fault-tolerant computer shown in FIG. 6.

If the assertion level of the Half-Full signals is set to such a level that the Almost-Full signals will not be asserted by a slippage of inbound access packets transmitted over the cross link, then flow control over inbound access can be achieved without generating flow control packets on the serial IO I/F cross link. In an asynchronous state, because flow control packets do not arrive over the cross link at the level of the Half-Full signals, the transmission of inbound packets to a different system cannot be stopped. When the Almost-Full signals occur, a flow control signal then occurs over the cross link as shown in FIG. 8. Basically, no Almost-Full signals are generated between the IO subsystems that operate in synchronism.

As described above, inasmuch as the Half-Full signals are added as flow control signals, almost no Almost-Full signals are generated, and no transaction control is performed on the complex serial IO I/F cross link. As a result, data flow control can be achieved in a short period of time.

While a preferred embodiment of the present invention has been described using specific terms, such description is for illustrative purposes only, and it is to be understood that changes and variations may be made without departing from the spirit or scope of the following claims.

What is claimed is:

1. A fault-tolerant computer comprising:
a pair of duplicate systems;
each of said duplicate systems comprising:
a Central Processing Unit (CPU) subsystem for controlling access to a CPU and a storage unit; and
an Input Output (IO) subsystem for controlling data which are input to said IO subsystem from an external circuit and data output from said IO subsystem to the external circuit;
wherein said CPU subsystems of the duplicate systems operate identically to each other based on a common internal clock according to a lock-step system, and said IO subsystems of the duplicate systems are connected to each other through a cross link;
wherein said CPU subsystem receives data sent from said IO subsystem, and when the amount of the received data reaches a first threshold value, said CPU subsystem sends a first signal to said IO subsystem, and when the amount of the received data reaches a second threshold value greater than said first threshold value, said CPU subsystem sends a second signal to said IO subsystem;
said IO subsystem comprising:
an IO interface (IO I/F) controller to stop sending data to said CPU subsystem when said IO I/F controller receives said first signal and said second signal; and
a flow controller for sending said second signal to the IO I/F controller of the paired IO subsystem through said cross link after said flow controller receives said second signal.

2. A method of controlling data transmission in a fault-tolerant computer having a pair of duplicate systems, each of said duplicate systems comprising a Central Processing Unit (CPU) subsystem for controlling access to a CPU and a storage unit, and an Input Output (IO) subsystem for controlling data which are input to said IO subsystem from an external circuit and data output from said IO subsystem to the external circuit, wherein said CPU subsystems of the duplicate systems operate identically to each other based on a common internal clock according to a lock-step system, and said IO subsystems of the duplicate systems are connected to each other through a cross link, said method comprising the steps of:

controlling said CPU subsystem to receive data sent from said IO subsystem, and when the amount of the received data reaches a first threshold value, controlling said CPU subsystem to send a first signal to said IO subsystem, and when the amount of the received data reaches a second threshold value greater than said first threshold value, controlling said CPU subsystem to send a second signal to said IO subsystem; and controlling said IO subsystem to stop sending data to said CPU subsystem when said IO subsystem receives said first signal and said second signal, and to send said second signal to the paired IO subsystem through said cross link after said IO subsystem receives said second signal.

\* \* \* \* \*